Dec. 22, 1964   R. A. HOLDEN   3,162,315
WORK BUSHING GUIDE FOR AUTOMATIC SCREW MACHINES
Filed Oct. 9, 1962   2 Sheets-Sheet 1
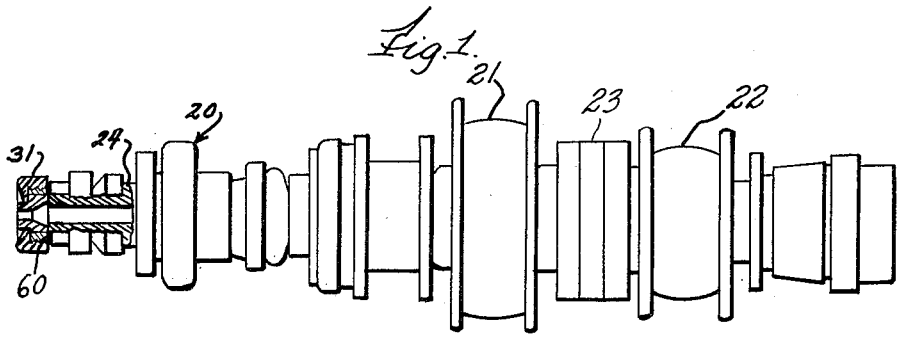
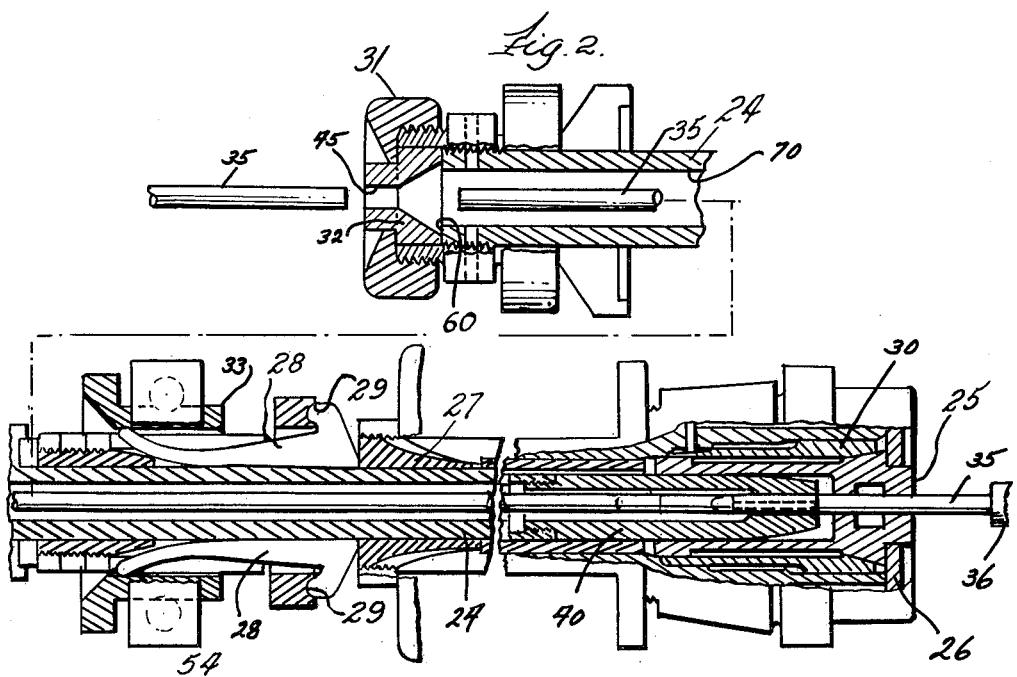
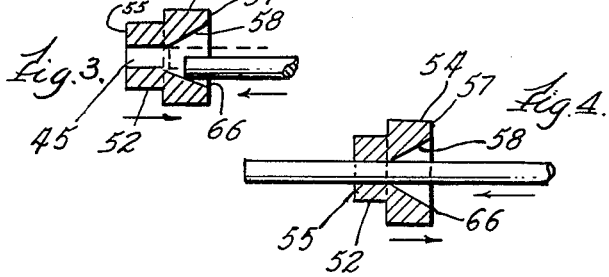
INVENTOR.
Richard A. Holden.

Dec. 22, 1964 R. A. HOLDEN 3,162,315
WORK BUSHING GUIDE FOR AUTOMATIC SCREW MACHINES
Filed Oct. 9, 1962 2 Sheets-Sheet 2
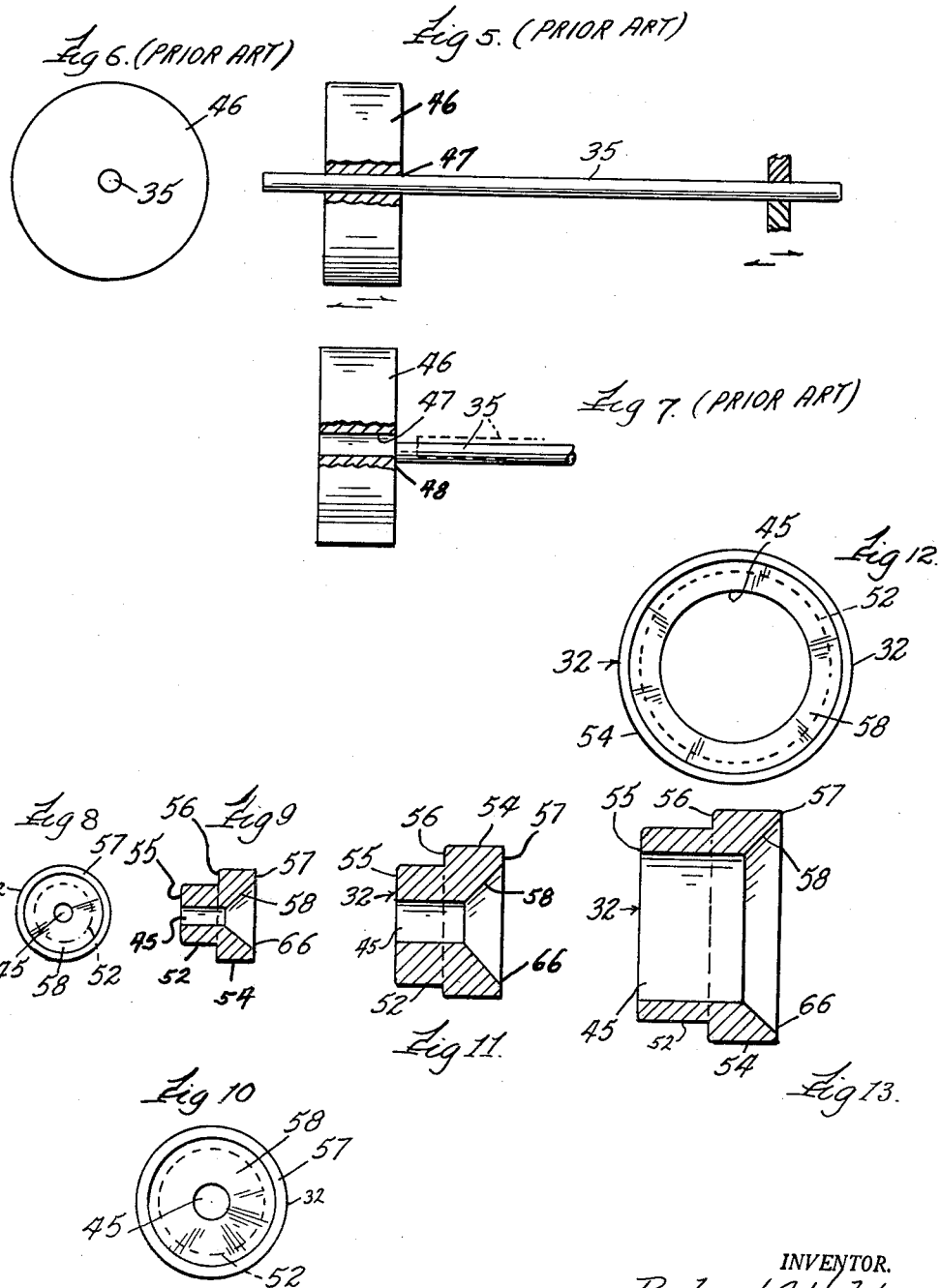
INVENTOR.
Richard A Holden.

United States Patent Office 3,162,315
Patented Dec. 22, 1964

3,162,315
WORK BUSHING GUIDE FOR AUTOMATIC
SCREW MACHINES
Richard A. Holden, 3852 W. 70th St., Chicago, Ill.
Filed Oct. 9, 1962, Ser. No. 229,323
5 Claims. (Cl. 214—1.1)

This invention relates to lathes and more especially to automatic screw machines for making quantities of metal parts of predetermined dimensions.

The principal object of this invention is to provide a bushing type guide means for supporting and guiding the otherwise unsupported end of a piece of stock to be substantially completely cut-up into desired lengths.

Another object of this invention is to provide an automatic screw machine which will operate at a high rate of output, which will automatically accurately position measured lengths of work to the cutting tool for cutting, which will effect feeding of the work for cutting and provide dimensional accuracy, and which will be substantially free of destrucive and/or work displacing vibrations in spite of its high speed.

A further object of this invention is to provide an improved work inlet bushing which has improved work contacting and feeding surface means for adapting the automatic screw machine with which it is used to accommodate bar stock of different sizes and will alllow the stock to be used to the extreme end or its utmost limit or extremity, the bar stock being fed concentrically to provide the desired degree of concentricity with the feed tube and spindle; and when the feed tube is retracted towards the rear of the machine when the forward end of a short bar comes in contact with the stop mechanism, the rear free end of any short bar will be guided into the bushing opening without any damage to the bar or machine parts used therewith.

A still further object of this invention is to provide a substantially cylindrical bushing which is to be rigidly held by the bushing holder secured to the rear end of a feeding tube, the bushing being provided with an axial bore formed in the central portion thereof, the head end portion forming a cylindrical portion larger in exterior diameter than the exterior diameter of the rear end portion, the rear end portion having a vertical end surface while the forward end thereof is provided with a beveled or conical surface to facilitate the insertion of the rear free end of a short piece of bar stock upon forward movement of the feeding tube of the automatic screw machine when the forward end of the bar stock contacts the bar stop means.

Other objetcs and various further features of novelty and invention will be pointed out or will occur to those skilled in the art, from a reading of the following specification in conjunction with the accompanying drawings. In said drawings, which show, for illustrative purposes only, preferred forms of the invention:

FIGURE 1 is a view in elevation showing a conventional spindle of an automatic screw machine, the entrance end thereof being shown in section with the new bushing assembled within the bushing holder;

FIGURE 2 is an enlarged fragmentary view of the spindle in elevation, parts broken away and in vertical section and showing a piece of bar stock therein and arranged in contact with the stop means;

FIGURE 3 is a vertical sectional view of the bushing of this invention with a fragmentary piece of bar stock in contact with the conical guide surface thereof, the dotted lines showing the desired axial position of the free bar end;

FIGURE 4 is a sectional view of the bushing shown by FIG. 3 and having the free rear end portion of the bar stock in axial alignment;

FIGURE 5 is a view in elevation showing a piece of bar stock in the bore of a conventional stock supporting bushing, parts broken away and in section;

FIGURE 6 is an end elevational view of the bushing and bar stock shown in FIG. 5;

FIGURE 7 is an elevational view of a conventional bushing and a fragmentary piece of bar stock, parts broken away to show position of the free end of the bar stock subject to destruction due to mis-alignment thereof, dotted lines showing correct axial alignment;

FIGURE 8 is a vertical end elevational view showing the conical surface of the bushing of this invention suitable for use with stock substantially ⅛ inch in diameter;

FIGURE 9 is a vertical sectional view of the bushing shown by FIG. 8;

FIGURE 10 is a vertical end elevational view, similar to FIG. 8, and suitable for bar stock substantially ¼ inch in diameter;

FIGURE 11 is a vertical sectional view of the bushing shown by FIG. 10;

FIGURE 12 is a vertical end elevational view, similar to FIGS. 8 and 10, and suitable for use with bar stock substantially 1⅛ inches in diameter; and FIGURE 13 is a vertical sectional view of the bushing shown by FIG. 12.

Referring to the drawings, specifically FIGURES 1 and 2, there is a spindle 20 which embodies two pulleys 21 and 22 suitably mounted on conventional bearings, a clutch 23 assembled between the said pulleys, a longitudinal feed tube 24, a spring collet 25, a nut 26 in contact with the shoulder of said collet 25, two chuck levers 28 fulcrumed at 29, a chuck sleeve 30 adjacent the collet 25, a sliding sleeve 27 arranged between the chuck sleeve 30 and chuck levers 28, an inlet bushing holder 31, a bushing 32 assembled in said holder 31 and through which the bar of stock 35 is fed therethrough, a stop means 36, a sliding sleeve 33 adjacent the rear end portion of the chuck levers 28, and the feeding finger 40 screw assembled to the forward end of said feed tube 24.

In automatic screw machines using multiple feed strokes in combination with a positive fed feed tube 24, many machine parts are often damaged when the rear free end of the bar stock is not in axial alignment with the central bore of the supporting bushing secured to the rear end of the feed tube 24.

Briefly stated, my invention contemplates improved guide bushing means for guiding the depending free end of a bar of stock into the central bore of the guide bushing so it will be free to travel within said bore, thereby preventing breakage of machine parts when the bar stock contacts the stop means and the feed tube moves forwardly since the bar stock is placed in axial alignment with the feed tube, feeding finger and spindle.

In actual operation, the bar of stock 35 is inserted through the bore 45 of bushing 32 assembled rigidly with the rear end of the feed tube, the bushing being between the end of the feed tube 24 and overlapping portions of the inlet bushing holder 31. The stock 35 enters the feed tube 24 and feeding finger 40, after which it is gripped firmly in the spindle by the spring collet 25. The spring collet 25 is located in the chuck sleeve 30 at the extreme front of the spindle 20 so that the stock may be held at a point as close as possible to the cutting tools. The shoulder of the collet 25 bears against the ground inner surface of the nut 26 which is secured up tight against the nose of the spindle, and, due to this arrangement, the collet has no end movement, hence it does not slide the bar along in closing and cause inaccuracies in feeding of the bar stock 35. The bar stock is fed forwardly by feeding finger 40 by one or more strokes until it engages the stop 36 after which the fingers slide on the bar stock. The chuck is closed when sliding sleeve 33 is at the left, in FIG. 2, and its operation is as follows: when sleeve 33 is moved to the left, the two chuck levers 28, whose fulcrums are at 29, force the sliding sleeve 27 forwardly, or to the right, thus forcing chuck sleeve 30 forward upon the taper of the spring collet 25 and closing it firmly upon the bar 35. On releasing the two chuck levers 28, through the movement of sleeve 33 to the right, the spring and taper of the collet are sufficient to slide chuck sleeve 30 and sliding sleeve 27 backwardly and the collet 25 thus opens. When the bar is used up, that is when the bar is so short that the feeding finger 40 cannot push the bar forwardly and into contact with the stop means, a new bar must be obtained and inserted through bore 45 of the housing 32. The location of the stock stop 36 governs the length of stock fed by the feeding finger 40.

My invention is applicable to any automatic screw cutting machine, and I do not describe the working parts thereof in detail, inasmuch as my invention is clearly understood by those skilled in the art.

The conventional bushing 46 adapted to be secured to the rear end of a feeding tube of a screw machine, shown by FIGURES 5 and 6, is a cylindrical member with a central bore 47 through which the stock will slide. In FIGURE 7, the free end of the bar stock 35 is shown outside the bore 47, and should the bushing be moved to the right when the feeding tube is moved to the right and the bar is motionless it will strike the end 48. Since the bar may have its opposite end in contact with stop 36, and the feeding tube and fingers are moved forwardly something will be forced and/or broken. In order to overcome this difficulty, my new bushing 32, shown separately in FIGURES 3, 9, 10, 11, 12 and 13, with central bore 45, has a body portion which specifically includes two end portions, the rear end portion 52 of which is slightly smaller in diameter than the outer end portion 54, said rear end portion 52 having a circular, flat, vertical end wall face 55. A vertical annular shoulder 56, or abutment, joins said end portion 52 with end portion 54, and said forward, outer end portion having an annular end portion 57 extending normal to its outer cylindrical surface for a short vertical distance to suitably abut the end 60 of the feed tube 24. Said bore 45 in said bushing 32 is cylindrical and extends from said rear wall surface 55 for a suitable distance, joining a countersunk forward end portion with straight tapered internal wall surface 58 which extends between said bore 45 and said annular end portion 57; said straight, tapered wall surface 58 forming an inwardly conical face meeting at an acute angle with the cylindrical surface of bore 45, and providing a truncated cone-shaped entrance cavity, the internal diameter 66 at the base of the cone being greater than the internal diameter 70 of the feed tube 24. Therefore, the rear end of any bar which is motionless because it has contacted the stop 36, and the bushing and feeding tube are moving forwardly, the rear end of the bar will slide upwardly and rearwardly into said cylindrical bore 45 of the bushing 32.

As shown by FIGURE 5, a long rod will move through the conventional bushing 46 with bore 47 in a satisfactory manner. Heretofore, considerable difficulty has been experienced with the feeding of the final piece of the bar stock. It is seldom that all of the bars of stock from which articles are made are in exact multiples of the length required of one article. It often happens that the last piece is so short that the rear end of the bar drops downwardly when the feeding tube is at its rear most position and the forward end of the bar is against the stop 36, then when the feeding tube moves forwardly the bushing strikes the rear end of the bar, straining the machine or breaking some part thereof. On multiple feeds, the bar stock often assumes the position shown by FIGURE 7 in the conventional machine, the lower edge of the bar being below the bore 47, thus causing rupture and breakage to the feed mechanism. This condition is further due to the fact that the internal diameter of the feed tube is larger than the internal diameter of the bore in the standard bushing. As long as the bar stock is of sufficient length to slide in the bore 47 no matter where the feeding tube and bushing are located, normal action takes place. However, when the bar stock is too short and the rear end of the bar stock becomes free of the bore 47 of the standard bushing it has the tendency to drop within the feed tube and adjacent the bushing. Therefore, when the stop 36 prevents movement of the stock forwardly and the feeding tube moves the bushing forwardly, the bushing strikes the rear end of the bar stock because it is no longer in axial alignment with the bore thereof. To overcome the above trouble, resulting in breakage of the feeding mechanism, I have provided an internal truncated shaped, or tapered working surface, the outer extremity being greater than the diameter of the feed tube, this surface will guide the depending end of any bar stock in an upwardly manner and into axial alignment with the central bore 45 of the bushing, as clearly shown by FIGURE 3.

It is thought from the foregoing description that the advantages and novel features of the invention will be readily apparent.

Although I have herein shown and described by way of example one embodiment of the invention, it is obvious that many changes may be made in the arrangements herein shown and described without departing from the spirit of the invention.

I claim:

1. In an automatic screw machine having multiple feeds with a spindle and a stop means for making articles from bar stock, a movable support for the outer free end of the bar stock being fed to the machine, a tubular bushing, said bushing secured within said support and through which the bar stock normally travels to the feed tube of the machine due to the feeding mechanism, said bushing having cylindrical end portions with the normal inlet end portion smaller in exterior diameter than the diameter of the normal outlet end portion, said bushing having a central longitudinal passageway extending therethrough, said passageway having a cylindrical bore at its normal inlet end and extending a fair distance therethrough and joining a truncated shaped cone-type cavity therein having an outwardly conical tapered inner wall surface, the diameter of the outer free end of said conical wall surface being greater than the inner diameter of the feed tube adjacent thereto in the machine, whereby there is established sufficient taper to the wall surface of the cavity to guide the free rear end of a rod pressed against its surface into said cylindrical bore at its inner end when the free rear end of a rod remains stationary as its opposite end contacts the said stop means and the support and bushing moves forwardly with the attached feed tube, thereby preventing non-movement of the rod and breakage of the feeding mechanism of the machine.

2. The combination with an automatic screw machine having a feed tube through which a rod of stock is intermittently advanced, for making articles from bar stock, of a movable support for the terminal end of the bar stock, said support being provided with a bushing having an outward contour of at least two diameters and through which the rod passes, said bushing arranged to abut the inlet end of said feed tube, said bushing having a central longitudinal passageway therethrough, the inlet end of said passageway being a cylindrical bore and the outlet end being a cavity with outwardly tapered walls, the smallest diameter of said cavity being equal to the diameter of said bore, the internal diameter of the forward open end of the conical cavity being greater than the inner diameter of the feed tube, whereby there is provided tapered wall means to guide the terminal free end of the bar stock upwardly and into alignment with said cylindrical bore, whereby the shock of sudden engagement of the terminal end of the last increment of bar stock and the forward end of the bushing during a lag in transmitted longitudinal motion is reduced.

3. In the construction of the character described, a reciprocatory feed tube through which a rod of stock to be intermittently advanced forwardly extends, feeding finger means assembled to the forward end of said feed tube and surrounding the rod and grasping it by the inherent tension of the feed finger means, a pusher member carried by the rear end portion of said feed tube to shift it and with it the feed finger means and the rod therein, and a bushing assembled with the rear end of said feed tube, said bushing having an outer contour of at least two diameters with a rear cylindrical portion and a larger forward cylindrical portion and having an internal cylindrical bore within the rear portion and an outwardly extending conical cavity with a straight tapered wall in the forward portion thereof, the internal diameter at the open end of said conical cavity being larger than the internal diameter of said feed tube to which it is assembled, said tapered wall of said bushing being outwardly flared at so small an angle that a piece of stock entering the open end of said conical cavity from said feed tube, when unison of movement of the rod is resisted, will be guided into said cylindrical bore of said bushing.

4. Bushing means as in claim 3, further characterised in that the internal diameter of the smaller end of said conical cavity is equal to the internal diameter of said cylindrical bore therein.

5. In the construction of the character described, a reciprocatory feed tube through which a rod of stock to be intermittently advanced extends, feeding finger means assembled to the forward end of said feed tube and surrounding the rod and grasping it by the tension of the fingers, a pushing member carried by the rear end portion of the feed tube to shift it and with it the feeding fingers and the rod therein, and a bushing assembled to the rear end of said feeding tube, said bushing having an outer contour of two diameters with a rear cylindrical portion and a larger forward cylindrical portion and having an internal cylindrical bore within the rear portion and an outward extending conical cavity with a straight tapered wall in the forward portion thereof, the internal diameter of the forward open end of the conical cavity being greater than the inner diameter of the feed tube, and the internal diameter of the rear end of said conical cavity being equal to the internal diameter of said bushing bore, whereby the shock of sudden engagement of the rear end of the last increment of rod stock and forward end of said bushing during a lag in transmitted longitudinal motion is reduced.

References Cited by the Examiner

UNITED STATES PATENTS

| 1,538,638 | 5/25 | Kalberer | 279—41 |
| 2,035,942 | 3/36 | Brinkman | 279—41 |
| 2,221,734 | 11/40 | Evans | 279—46 |
| 2,228,863 | 1/41 | Wright et al. | 279—46 |
| 2,373,155 | 4/45 | White | 82—2.5 |
| 2,691,799 | 10/54 | Moeller | 16—2 |
| 2,741,483 | 4/56 | Cox | 279—41 |

FOREIGN PATENTS 556,271 9/43 Great Britain.

ANDREW R. JUHASZ, *Primary Examiner.*